United States Patent

[11] 3,563,437

| [72] | Inventor | Ladislav Dubny |
| | | Prerov, Czechoslovakia |
| [21] | Appl. No. | 826,494 |
| [22] | Filed | May 21, 1969 |
| [45] | Patented | Feb. 16, 1971 |
| [73] | Assignee | Meopta, narodni podnik |
| | | Prerov, Czechoslovakia |

[54] FILM CARRIER
8 Claims, 7 Drawing Figs.

[52] U.S. Cl. .................................................. 226/196,
352/224
[51] Int. Cl. .................................................. B65h 23/02,
G03b 1/44
[50] Field of Search ........................................ 226/196;
352/224; 95/94

[56] References Cited
UNITED STATES PATENTS

| 2,996,951 | 8/1961 | Debrie .................... | 226/196UX |
| 3,421,675 | 1/1969 | Brown ..................... | 226/196 |

Primary Examiner—Richard A. Schacher
Attorney—Richard Low

ABSTRACT: A film carrier to be used with enlargers or other photographic reproducing apparatus has a pair of apertured plates between which the part of the film which is exposed is held. A pair of elongated guides which extend in the direction of film movement are respectively fixed to and extend from opposed ends of one of these plates. Each of these guides has, in a plane normal to the plane of the film between the plates and extending perpendicularly across the guide and the direction of movement of the film strip, a pair of film-engaging portions which respectively engage only opposed edges of the filmstrip and which extend at least in part along a pair of distinct lines that intersect to form a V-shaped configuration.

PATENTED FEB 16 1971 3,563,437

INVENTOR
Ladislav Dubný
BY
Richard Low agt

FILM CARRIER

BACKGROUND OF THE INVENTION

The present invention relates to filmstrip carriers and more particularly to filmstrip carriers to be used with a photographic reproducing apparatus such as enlargers.

Conventional filmstrip carriers of this type have dished filmstrip holders situated on opposed sides of the part of the carrier, which engages the portion of the filmstrip which is exposed. These dish-shaped filmstrip holders extend longitudinally of the filmstrip in the direction of movement thereof when the strip is displaced from one frame to the next. Inasmuch as it is desirable that the surface of the filmstrip be engaged to the minimum possible extent, so as to avoid scratching or other marring of the film surface, the dished holders are arranged so as to avoid as much as possible engagement with the image-carrying parts of the filmstrip.

It has thus been proposed to provide such dished filmstrip holders with a profile which in section is of a stepped configuration in a plane perpendicular to the longitudinal axis of the filmstrip. The steps of such a construction are designed to contact the filmstrip only at its opposed edges beyond the image-carrying portions thereof. However, in the case where the carrier is adapted for use with different sizes of filmstrips, particularly filmstrips of different widths, it becomes necessary to provide a relatively large number of steps, so that a considerable disadvantage is encountered both in the manufacture and in the use of such a construction.

It has also been proposed to provide such dished filmstrip holders with a configuration according to which the surface which is directed toward the filmstrip extends along a continuous concave curve. Such an inner surface of the holder, which is directed toward the film is conventionally manufactured in such a way as to form part of a sphere. While such a design is indeed an improvement over the stepped configuration and is of a certain advantage for the operator, it is of considerable disadvantage in connection with manufacture of the structure because fastening of such elements to the remainder of the filmstrip carrier presents manufacturing problems which up to the present time have not been satisfactorily solved. Thus, in the manufacture of a spherical profile it is difficult to provide the holder with the proper construction in a simple, inexpensive and reliable manner.

SUMMARY OF THE INVENTION

It is accordingly a primary object of the present invention to provide a construction which will avoid the above drawbacks.

In particular, it is an object of the invention to provide a structure which will maintain the operational advantages of the type of filmstrip carrier where a concave curved surface is directed toward the filmstrip to engage the latter at its edges, while at the same time overcoming the difficulties encountered in the manufacture of a conventional construction of this latter type.

Thus, it is an object of the invention to provide a construction which can be manufactured easily and in a fully reliable and inexpensive manner, while at the same time assuring that a filmstrip, irrespective of its width, will be engaged only at its edges.

According to the invention, the filmstrip carrier has a pair of flat plate portions respectively formed with aligned openings through which the light passes to project an image onto printing paper, as is well known. Thus, the part of the film which is being reproduced will normally be held between such a pair of plates. Fixed to opposed ends of one of these plates are a pair of film guides of the invention, which extend longitudinally from the opposed ends of this one plate in the direction of film movement when the film is displaced from one frame to the next.

Thus, the pair of plates form a fixed plate and a pressure plate, while the pair of film guides will extend from the opposed ends of the fixed plate. Each of the film guides of the invention has, in a plane normal to the filmstrip and the plane in which the film is held between the plates, extending transversely across the longitudinal axis of the filmstrip and the direction of movement thereof, a configuration according to which each film guide has a pair of filmstrip engaging portions which engage only opposed edges of the filmstrip and which respectively extend at least partly along a pair of intersecting lines which intersect to form a V-shaped configuration provided with a relatively large obtuse angle between the pair of lines. These lines which intersect and along which the film-engaging portions extend at least in part may be straight or they may be curved so as to present convex surfaces to the film.

With this construction it has been found that while all of the advantages of presently known concave film-engaging guides which form parts of a sphere are retained, at the same time considerable simplicity in the manufacture and reduction of cost of the device is achieved.

BRIEF DESCRIPTION OF DRAWING

The invention is illustrated by way of example in the accompanying drawing which forms part of this application and in which.

DESCRIPTION OF PREFERRED EMBODIMENTS

Figure 1:
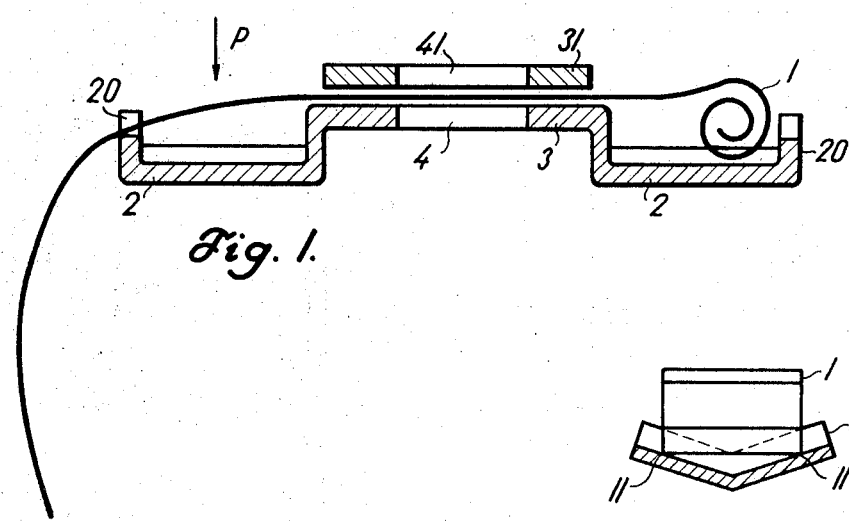
FIG. 1 is a longitudinal sectional view of a filmstrip carrier of the invention.
Figure 2:
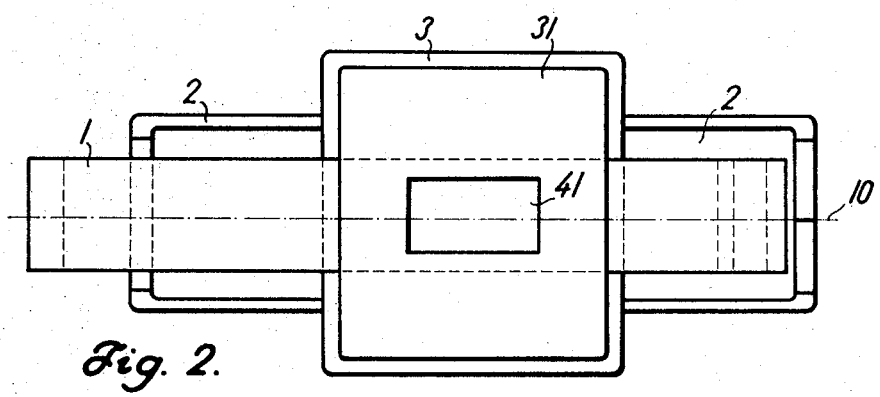
FIG. 2 is a top plan view of the carrier of FIG. 1, both FIGS. 1 and 2 showing how film is guided.
Figure 4:
FIG. 4 is a section corresponding to FIG. 3 but of a different embodiment of a film guide.

Referring now to FIGS. 1 and 2, it will be seen that the filmstrip carrier of the invention is provided with a fixed plate 3 formed with a film gate 4. The plate 3 coacts with a pressure plate 31 provided with a window or aperture 41. The openings 4 and 41 are aligned with each other so that light from a suitable lamp can be directed through the part of the film extending across the aligned apertures 4 and 41 so as to direct, in a well known manner, an image through a suitable objective onto printing paper, for example, in an enlarger. The plates 3 and 31 coact to clamp the film in a flat plane between themselves during operation of the reproducing apparatus. As is apparent from FIG. 2, the filmstrip 1 extends longitudinally and has a longitudinal axis 10, and the filmstrip is moved in the direction of the axis 10 when displaced from one frame to the next during operation of the apparatus. A pair of elongated dished film guides 2 are respectively fixed to and extend from opposed ends of the plate 3.

Figure 3:
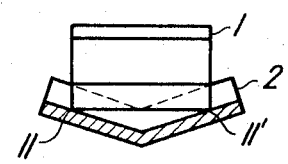
FIG. 3 is a transverse sectional elevation of the right guide of FIG. 1, taken in a plane normal to the direction of film movement.

As may be seen from FIG. 3, each elongated film guide 2 has, in a plane which is normal to the plane of film held between the plates 3 and 31 and which extends perpendicularly across the filmstrip and the direction of longitudinal movement thereof, a pair of film-engaging portions which engage the filmstrip 1 only at its edges and which respectively extend at least partly along a pair of lines which are situated in this transverse plane and which intersect each other so as to have a substantially V-shaped configuration. As is apparent from FIG. 3, this configuration is a V which is wide open in the sense that it has an obtuse angle considerably greater than 90°, which only somewhat less than 180°, between the pair of straight lines along which the pair of film-edge engaging portions extend at least in part.

In the particular embodiment shown in FIG. 3, the pair of film-engaging portions 2a and 2b intersect each other to form the elongated guide of V-shaped cross section as illustrated. Thus, the pair of intersecting elongated portions of each film guide 2 extend in the direction of film movement, parallel to the axis 10 while engaging the film strip only at the points 11 and 11' at the outer edges of the filmstrip in any plane which extends perpendicularly across the filmstrip normal to the axis 10.

Each of the film guides 2 terminates distant from the plate 3 in a flange 20 which is also of a V-shaped configuration matching the V-shaped configuration of the pair of elongated edge engaging portion 2a, 2b of the film guide 2. As a result of this construction, it is possible, as shown at the left of FIG. 1, for the film 1 to be guided, without being coiled, across the flange 20 and to engage the V-shaped edge thereof only at the edges of the filmstrip to achieve in this way also the advantages derived, for example, with a coiled filmstrip as shown schematically at the right portion of FIG. 1.

FIGS. 4 to 7 illustrate various different possibilities for the profile of the guides 2 of the invention. The construction of FIG. 4 corresponds to that of FIG. 3 except that the central portion of the guide is omitted so that this guide has a pair of elongated strips 2a' and 2b', extending only in part along the pair of lines which intersect in the plane normal to the axis 10.

Figure 5:
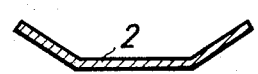
FIGS. 5 to 7 are transverse sections corresponding to FIG. 3 but illustrating further embodiments of the film guide of the invention.

In FIG. 5, there are also a pair of separate oppositely inclined portions which extend only in part along the pair of lines which intersect to form the V-shaped configuration in the plane normal to the axis 10. However, in the case of FIG. 5 these opposed separate portions are interconnected by an intermediate portion 5 of the guide, which extends parallel to the film or, in other words, parallel to the plane in which the film is held between the plates 3 and 31.

Figure 6:

According to the embodiment shown in FIG. 6, the oppositely inclined elongated guide portions terminate at their outer edges in a pair of flanges 6, 6' extending parallel to the axis 10 so that the filmstrip can conveniently be confined between these flanges.

Figure 7:
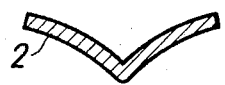

According to the embodiment of FIG. 7, the pair of elongated film-engaging portions 7, 7' of the guide 2 also intersect each other, as in the case of FIG. 3, but these film-engaging portions are transversely curved so as to have convex surfaces directed toward the film strip, the film-engaging portions 7 and 7' engaging the filmstrip only at its opposed side edges. It is to be noted that the curvature of the guides shown in FIG. 7 is only relatively slight. Thus, while in the embodiments of FIGS. 3 to 6 the film-engaging portions extend along straight lines, in FIG. 7 these lines are slightly curved.

It will be noted that in all cases it is a simple matter, from a manufacturing standpoint, to provide the pair of opposed guides 2 which extend integrally, for example, from opposed ends of the plate 3. Moreover, the configuration of the guides 2 of the invention is such that they will adapt themselves to filmstrips of different widths. Furthermore, engagement of the film only at its edges is assured, so that damaging of the image-carrying portion of the filmstrip is reliably avoided.

I claim:

1. A filmstrip carrier for photographic enlargers and the like, comprising a pair of plates respectively formed with aligned openings and between which a filmstrip is to be held, and a pair of guides extending longitudinally of the filmstrip in the direction of movement thereof and fixed to and extending from opposed ends of one of said plates, each of said guides having in a plane normal to the direction of movement of the filmstrip and extending perpendicularly across each guide a pair of filmstrip engaging portions for respectively engaging only outer edges of the filmstrip with said portions respectively extending at least partly along a pair of distinct lines which intersect each other in said plane and which have a substantially V-shaped configuration.

2. The combination of claim 1 and wherein each of said guides is in the form of an elongated member of V-shaped cross section.

3. The combination of claim 1 and wherein each guide terminates distant from said one plate in a flange of V-shaped cross section.

4. The combination of claim 1 and wherein said portions of each guide are spaced from each other.

5. The combination of claim 4 and wherein said spaced portions define a free space between themselves.

6. The combination of claim 4 and wherein said spaced portions are interconnected by an intermediate portion which extends substantially parallel to the filmstrip.

7. The combination of claim 1 and wherein said portions of each guide terminate at their outer edges in elongated flanges extending in the direction of the filmstrip.

8. The combination of claim 1 and wherein said portions of each guide are curved and respectively provided with convex surfaces for engaging the edges of the filmstrip.